(12) United States Patent
Timmerman et al.

(10) Patent No.: US 7,477,505 B2
(45) Date of Patent: Jan. 13, 2009

(54) CAPACITOR BANK FOR ELECTRICAL GENERATOR

(75) Inventors: Mark Timmerman, Vancouver (CA); Alan John Mulvenna, North Vancouver (CA)

(73) Assignee: General Hydrogen Corporation, Richmond, B.C. (CA)

( * ) Notice: Subject to any disclaimer, the term of this patent is extended or adjusted under 35 U.S.C. 154(b) by 375 days.

(21) Appl. No.: 11/477,448

(22) Filed: Jun. 30, 2006

(65) Prior Publication Data

US 2007/0086146 A1   Apr. 19, 2007

Related U.S. Application Data

(63) Continuation-in-part of application No. 11/436,594, filed on May 19, 2006, and a continuation-in-part of application No. 11/360,486, filed on Feb. 24, 2006, and a continuation-in-part of application No. 11/251,792, filed on Oct. 18, 2005.

(30) Foreign Application Priority Data

| | | | |
|---|---|---|---|
| Oct. 18, 2005 | (CA) | ................................ | 2523640 |
| Feb. 24, 2006 | (CA) | ................................ | 2537728 |
| May 10, 2006 | (CA) | ................................ | 2546544 |

(51) Int. Cl.
*H01G 9/00* (2006.01)

(52) U.S. Cl. ................. 361/502; 361/503; 361/504; 361/508; 361/512; 361/328

(58) Field of Classification Search ............. 361/502, 361/503–504, 303, 305, 328, 301.3, 301.4, 361/508, 512

See application file for complete search history.

(56) References Cited

U.S. PATENT DOCUMENTS 1,883,778 A   10/1932   Freeman (Continued)

FOREIGN PATENT DOCUMENTS

WO   WO 02/79012   10/2001

(Continued)

OTHER PUBLICATIONS

Vasquez et al., *Development of a Space-Rated Proton Exchange Membrane Fuel Cell Power Plant* American Society of Mechanical Engineers, Advanced Energy Systems Division, 1999, V.39, pp. 317-325.

*Primary Examiner*—Nguyen T Ha

(57) ABSTRACT

A capacitor bank for an electrical power generator comprises: a positive assembly having a positive electrical terminal; a negative assembly having a negative electrical terminal; at least one capacitor sandwiched between and electrically coupled to the positive and negative assemblies; and electrical interconnects coupled to each of the terminals and for coupling to a load or to another capacitor bank. The positive and negative assemblies of the capacitor bank are each stackable on the positive and negative assemblies of another capacitor bank. When two capacitor banks are stacked with their positive assemblies facing each other, the interconnects couple the capacitor banks in series, and when two capacitor banks are stacked with a positive assembly facing a negative assembly, the interconnects couple the capacitor banks in parallel. A plurality of such capacitor banks can be electrically connected in series and/or in parallel in a number of different configurations, thereby providing a highly customizable capacitor bank assembly to suit the particular needs of the electrical power generator.

16 Claims, 22 Drawing Sheets

U.S. PATENT DOCUMENTS

| | | | |
|---|---|---|---|
| 2,002,273 A | 5/1935 | Parker | |
| 2,252,242 A | 8/1941 | Wood | |
| 2,971,750 A | 2/1961 | Boiling | |
| 3,262,682 A | 7/1966 | Bredberg | |
| 3,322,405 A | 5/1967 | Knudson et al. | |
| 3,792,841 A | 2/1974 | Munters | |
| 3,850,696 A | 11/1974 | Summers et al. | |
| 3,947,532 A | 3/1976 | Skold et al. | |
| 3,977,364 A | 8/1976 | Gijsbers et al. | |
| 4,031,180 A | 6/1977 | Bohanon | |
| 4,933,117 A | 6/1990 | Wilson | |
| 4,977,756 A | 12/1990 | Brock | |
| 5,037,583 A | 8/1991 | Hand | |
| 5,162,088 A | 11/1992 | Peng | |
| 5,211,891 A | 5/1993 | Anoszko | |
| 5,349,829 A | 9/1994 | Tsimerman | |
| 5,783,928 A | 7/1998 | Okamura | |
| 5,857,350 A | 1/1999 | Johnson et al. | |
| 5,898,561 A * | 4/1999 | Mandelcorn et al. | 361/301.4 |
| 5,932,148 A | 8/1999 | Hansell, Jr. et al. | |
| 6,030,718 A | 2/2000 | Fuglevand et al. | |
| 6,247,327 B1 | 6/2001 | An et al. | |
| 6,257,359 B1 | 7/2001 | Granlund et al. | |
| 6,265,851 B1 | 7/2001 | Brien et al. | |
| 6,315,272 B1 | 11/2001 | Stanek et al. | |
| 6,394,427 B1 | 5/2002 | Guetersloh et al. | |
| 6,411,491 B2 * | 6/2002 | Lawless et al. | 361/276 |
| 6,424,156 B1 | 7/2002 | Okamura | |
| 6,426,862 B1 * | 7/2002 | Vasechkin et al. | 361/502 |
| 6,536,722 B2 | 3/2003 | Sadowski et al. | |
| 6,545,609 B2 | 4/2003 | Shimanuki et al. | |
| 6,572,085 B2 | 6/2003 | Bloemer | |
| 6,579,637 B1 | 6/2003 | Savage et al. | |
| 6,602,625 B1 | 8/2003 | Chen et al. | |
| 6,649,290 B2 | 11/2003 | Leboe et al. | |
| 6,682,840 B2 | 1/2004 | Boneberg et al. | |
| 6,687,118 B1 * | 2/2004 | O'Phelan et al. | 361/508 |
| 6,696,186 B1 | 2/2004 | Herdeg et al. | |
| 6,713,204 B2 | 3/2004 | Shimanuki et al. | |
| 6,787,254 B2 | 9/2004 | Cargnelli et al. | |
| 6,787,256 B2 | 9/2004 | Matsui et al. | |
| 6,790,550 B2 | 9/2004 | Imamura et al. | |
| 6,805,988 B2 | 10/2004 | Shimanuki et al. | |
| 6,806,686 B1 | 10/2004 | Thrap | |
| 6,832,647 B2 | 12/2004 | Voss et al. | |
| 6,838,923 B2 | 1/2005 | Pearson | |
| 6,861,167 B2 | 3/2005 | Wells et al. | |
| 6,864,005 B2 | 3/2005 | Mossman | |
| 6,869,717 B2 | 3/2005 | Cargnelli et al. | |
| 6,875,535 B2 | 4/2005 | Ye et al. | |
| 6,899,062 B2 | 5/2005 | Bruck et al. | |
| 6,929,028 B2 | 8/2005 | Larsen et al. | |
| 6,939,629 B2 | 9/2005 | Katagiri et al. | |
| 6,953,635 B2 | 10/2005 | Suzuki et al. | |
| 7,126,810 B1 * | 10/2006 | Mueller et al. | 361/328 |
| 7,207,405 B2 | 4/2007 | Reid et al. | |
| 7,251,121 B2 * | 7/2007 | Bhutta | 361/328 |
| 2001/0010875 A1 | 8/2001 | Katagiri et al. | |
| 2001/0052433 A1 | 12/2001 | Harris et al. | |
| 2002/0039674 A1 | 4/2002 | Suzuki et al. | |
| 2002/0112499 A1 | 8/2002 | Goldfine | |
| 2002/0155328 A1 | 10/2002 | Smith et al. | |
| 2003/0003337 A1 | 1/2003 | Scartozzi et al. | |
| 2003/0022041 A1 | 1/2003 | Barton et al. | |
| 2003/0070850 A1 | 4/2003 | Reid et al. | |
| 2003/0096144 A1 | 5/2003 | Dunstan | |
| 2004/0043274 A1 | 3/2004 | Scartozzi et al. | |
| 2004/0062975 A1 | 4/2004 | Yamamoto et al. | |
| 2004/0245031 A1 | 12/2004 | Reid et al. | |
| 2004/0258969 A1 | 12/2004 | Hartnack et al. | |
| 2005/0041370 A1 | 2/2005 | Wilk et al. | |
| 2005/0110172 A1 | 5/2005 | Tanaka et al. | |
| 2005/0116365 A1 | 6/2005 | Yazawa | |
| 2006/0061922 A1 | 3/2006 | Mihai et al. | |
| 2007/0087232 A1 * | 4/2007 | Robin et al. | 429/13 |

FOREIGN PATENT DOCUMENTS

| | | |
|---|---|---|
| WO | WO 02/061861 | 8/2002 |
| WO | WO 02/067346 | 8/2002 |
| WO | WO 2004/017450 | 2/2004 |
| WO | WO 2005/043046 A1 | 5/2005 |
| WO | WO 2006/024124 | 3/2006 |

* cited by examiner

CAPACITOR BANK FOR ELECTRICAL GENERATOR

RELATED APPLICATION

This application is a continuation-in-part of U.S. application Ser. No. 11/360,486 "Fuel Cell Fluid Dissipator" to Robin et al., filed on Feb. 24, 2006; U.S. application Ser. No. 11/251,792 "Fluid Management System" to Mulvenna et al., filed on Oct. 18, 2005; and U.S. application Ser. No. 11/436, 594 "Fuel Cell Power Pack" to Mulvenna et al., filed on May 18, 2006, which are all incorporated herein by reference in their entirety and for all teachings, disclosures and purposes.

TECHNICAL FIELD

This invention relates to electrical power generation, and in particular to a capacitor bank for an electrical power generator.

BACKGROUND OF THE INVENTION

Fuel cells generate electricity from an electrochemical reaction between a hydrogen-containing fuel and an oxidant. One type of fuel cell is a proton-exchange-membrane (PEM) fuel cell, which uses a proton conductive membrane such as NAFION® to separate the fuel and oxidant reactants. Other known fuel cells include solid oxide fuel cells (SOFC), alkaline fuel cells and direct methanol fuel cells (DMFC). Such fuel cells can be stacked together to provide a greater voltage than can be generated by a single fuel cell.

Because fuel cells generate electricity electrochemically rather than by combustion, pollutants found in combustion products can be avoided, and fuel cells are perceived to be an environmentally friendlier alternative to combustion engines. Applications for fuel cells include stationary and portable power generators, and vehicular powerplants.

Especially in vehicular applications, the load on the fuel cell stack can vary dramatically over an operating cycle. Efforts have been made to develop efficient "load-following" fuel cell systems, which can quickly increase or decrease electrical output to match the load changes demanded by the application. However, load-following tends to impose stresses on the fuel cell system, thereby increasing wear and tear on the fuel cell system components and decreasing system operating life.

One approach to reducing the stress on fuel cell systems used in variable load applications is to couple the fuel cell stack in parallel to an energy storage device, such as an electrochemical battery, to produce a "hybrid" power system. In such an arrangement, the battery acts like a buffer for the fuel cell stack, supplying electricity in times of high demand, thereby reducing the peaks in electrical demand on the fuel cell system; when demand is low, the fuel cell stack can recharge the battery. Therefore, the load variations imposed on the fuel cell stack are smoothed and system operating life can be extended.

FIG. 1 illustrates an electrical schematic of a prior art hybrid fuel cell system 91 comprising a fuel cell stack 92, voltage conversion equipment 93, and a battery packet 94, all connected in parallel, and power distribution conductors 95, 96 to allow the parallel connection of a load. The fuel cell stack 92 is capable of generating electricity, provided that fuel and oxidant (collectively, "reactants") are supplied, as is well known for fuel cell stacks. The voltage conversion equipment 93 is typically a DC/DC voltage converter that has a pulse width modulator, as is well known for direct current voltage regulation. The fuel cell generator, voltage regulation equipment, battery pack and load are coupled in parallel so that the both the fuel cell generator and the energy storage device can provide power to the load, and the fuel cell generator can provide energy to the energy storage device. The battery pack 94 has typically been provided to power peak load demands and to provide power to start the fuel cell generator 92.

There are challenges with implementing a battery hybrid fuel cell system as shown in FIG. 1. One of the most significant challenges is determining the state of charge of the battery. Typically, the battery's state is determined by measuring the current draw on the battery; however this approach does not provide a precise measurement of the battery's charge state, and therefore, it is difficult to precisely determine when and how much the battery needs to be charged by the fuel cell stack. Furthermore, electrochemical batteries do not have a particularly fast discharge rate, and thus sometimes may be not be able to meet the power demands by the load. Another disadvantage of using a battery in such a hybrid configuration is that the battery has a relatively slow recharge rate, and thus may not be able to be recharged quickly to supply power to rapidly variable loads.

There is thus a need to provide an effective fuel cell system that can supply power to highly variable loads in a way that does not unduly stress the fuel cell stack and reduce its operating life.

SUMMARY OF THE INVENTION

According to one aspect of the invention, there is provided a capacitor bank for an electrical power generator, comprising: a positive assembly having a substantially planar surface and a positive electrical terminal; a negative assembly having a substantially planar surface and a negative electrical terminal; at least one capacitor sandwiched between and electrically coupled to the positive and negative assemblies; and electrical interconnects coupled to each of the terminals and for coupling to a load or to another capacitor bank. The positive and negative assemblies of the capacitor bank are each stackable on the positive and negative assemblies of another capacitor bank to form a capacitor bank assembly. A plurality of such capacitor banks can be electrically connected in series and/or in parallel in a number of different configurations, thereby providing a highly customizable capacitor bank assembly to suit the particular needs of the electrical power generator.

The positive and electrical terminals can be located at the perimeters of their respective assemblies; such location enables the interconnects to extend vertically to couple to terminals of an adjacent stacked capacitor bank. The interconnects can comprise a hyperboloid socket and an electrical contact pin coupled to the socket and that extends to couple with a hyperboloid socket of another interconnect in another capacitor bank.

Two capacitor banks can be coupled in parallel or series in a number of different configurations. In one configuration, the positive assembly contacts the negative assembly of another capacitor bank, a negative contact pin couples the negative terminals of the respective capacitor banks, and a positive contact pin couples the positive terminals of the respective capacitor banks, thereby establishing a parallel electrical connection between the respective capacitor banks. In this configuration, positive and negative contact pins extend substantially perpendicular to the positive assembly to connect the respective negative terminals together, and the respective positive terminals together.

In another configuration, the positive assembly contacts the positive assembly of another capacitor bank, a contact pin couples the negative terminal of the capacitor bank with the positive terminal of the other capacitor bank, thereby establishing a series electrical connection between the respective capacitor banks. In this configuration the contact pin extends substantially perpendicular to the positive assembly. In yet another configuration, the positive assembly contacts the negative assembly of another capacitor bank, a contact pin couples the positive terminal of the capacitor bank with the negative terminal of the other capacitor bank, thereby establishing a series electrical connection between the respective capacitor banks. In this configuration, the contact pin extends substantially parallel to the positive assembly.

The capacitor bank can comprise a plurality of double-layer capacitors. The capacitors can comprise multiple series-connected groups of capacitors, wherein the capacitors within a group of capacitors are connected together in parallel. Each assembly can include a bus bar assembly having multiple bus bars wherein each bus bar connects the capacitors within a group in parallel. Each assembly can also include a circuit board having at least one voltage balancing circuit electrical coupled to multiple capacitor groups. The voltage balancing circuit can include one or more voltage sensors which measure the voltage across one or more capacitors. The measurement of such voltage is useful in determining the state of charge of the capacitor.

The capacitor can be welded to at least one associated bus bar. Such welding produces a stiff and rugged structure that is resistant to shock and vibrations. Such welding also reduces or eliminates the need to use nut and bolt fasteners in the capacitor bank, thereby enabling the capacitor bank to be made more compact.

DETAILED DESCRIPTION OF EMBODIMENTS OF THE INVENTION

Generator Components

Figure 1:
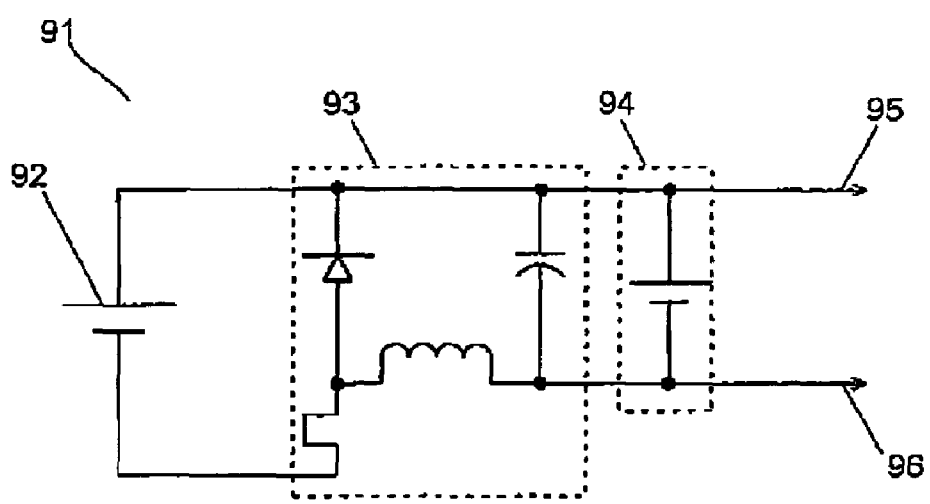
FIG. 1 is an electrical schematic of a prior art hybrid fuel cell power system.
Figure 2:
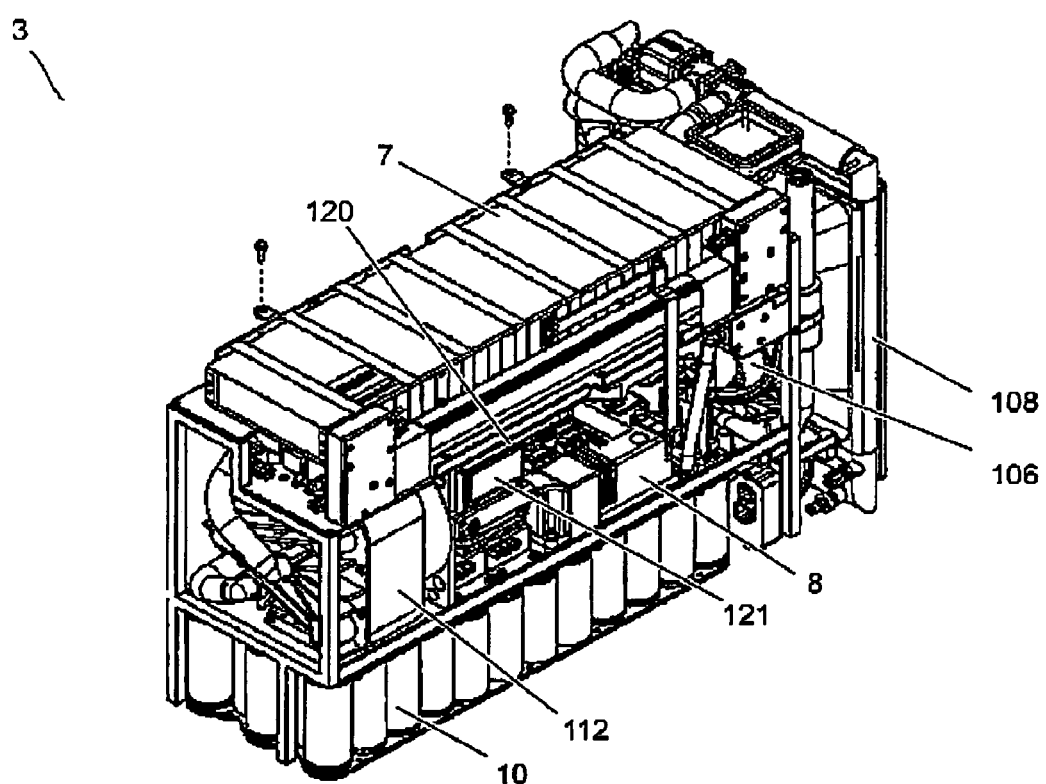
FIG. 2 is a perspective view of a hybrid fuel cell power generator according to a first embodiment of the invention.

Referring to FIG. 2 and according to one embodiment of the invention, an electrical power generator 3 is provided which comprises a fuel cell stack 7 and a double-layer capacitor bank 10 electrically coupled in parallel. The fuel cell stack 7 electrochemically reacts gaseous hydrogen fuel supplied from a fuel tank (not shown) and oxygen from ambient air to produce electricity. By-products of the reaction include water and heat. The fuel cell stack 7 comprises a plurality of a proton exchange membrane (PEM) type fuel cells; a suitable such fuel cell stack is the Mark 902 stack manufactured by Ballard Power Systems. However, it is within the scope of the invention to use other fuel stacks as is known in the art.

As discussed in detail below under the heading "Capacitor Bank", the capacitor bank 10 is made up of a plurality of double-layer capacitors connected in series to provide a capacitor voltage sufficient to meet the voltage requirements of a load, and each series-connect double-layer capacitor may consist of groups of parallel-connected double-layer capacitors so grouped to provide a current capacity sufficient to meet the current requirements of the load.

The generator 3 operates to supply load-following power from the capacitor bank 10 or the fuel cell stack 7, or both, as circumstances dictate. The generator 3 executes an operating strategy that operates the fuel cell stack 7 within parameters that reduces stress on the fuel cell stack 7, thereby increasing the stack's operating life. The operating strategy includes defining a stack operating range which minimizes the stress on the stack 7, then using the capacitor bank 10 to supplement the stack output by providing power when a load on the generator 3 exceeds the stack operating range. When the load drops to within or below the stack operating range, the operating strategy includes conducting some of the stack output to recharge the capacitor bank 10, and to shut down the stack 7 if necessary, i.e. when the load is below the stack operating range and the capacitor bank 10 is fully charged. Another aspect of the operating strategy is to reduce the frequency at which the stack 7 is started up and shut down, as such cycling tends to impose stress on the stack 7. Therefore, when the load falls below the stack operating range for an extended period of time, the generator 3 will reduce the recharging rate of the capacitor bank 10 in order to extend the period of time that the stack remains on, i.e. continues to generate electricity. This strategy is particularly effective when the load is highly variable, and tends to reduce the frequency which the stack 7 starts up and shuts down.

The generator 3 also includes "balance of plant" components 16 for controlling the supply of oxidant and fuel to the fuel cell stack, controlling and conditioning the supply of electricity generated by the stack 7, cooling and humidifying the stack 7, and removing excess water, unreacted fuel and air and contaminants from the stack 7. Such balance of plant components 16 include at least a cooling system fan 106, a radiator 108; and an air compressor 112.

Generator Power Circuit

Figure 3:
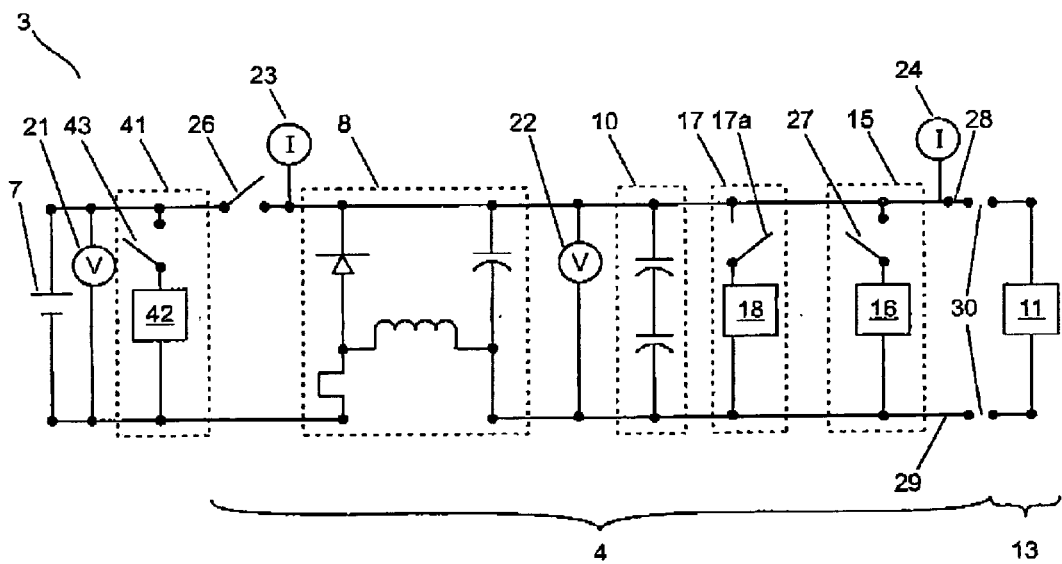
FIG. 3 is an electrical schematic of components in the power generator.

Referring to FIG. 3, the fuel cell stack 7 and capacitor bank 10 are electrically coupled in parallel to a power circuit 4, which in turn can be electrically coupled to a variable load 11 by a load circuit 13. The power circuit 4 comprises positive and negative conductors 28, 29 that conduct electricity generated by the stack 7 to the load 11. A voltage converter 8 is located on the power circuit 4 between the stack 7 and the capacitor bank 10 and serves to convert the voltage of electricity generated by the stack 7 to a voltage required by the load 11. The voltage converter 8 includes a pulse width modulator for modulating an input voltage to an output voltage, as is well known in the art.

A first contactor 26 is provided on the positive conductor 28 between the stack 7 and the voltage converter 8 and serves to electrically couple and uncouple the stack 7 from the power circuit 4. A stack voltage sensor 21 is connected to the power circuit 4 between the stack 7 and the first contactor 26 and measures stack voltage. A stack current sensor 23 is connected to the positive conductor 28 between the first contactor 26 and voltage converter 8 and measures stack current.

The balance of plant components 16 are electrically coupled to the power circuit 4 by a component circuit 15 which is located on the power circuit 4 between the capacitor bank 10 and the load 11. A second contactor 27 is provided on the component circuit 15 to couple or uncouple the balance of plant components 16 from the power circuit 4. A controller assembly 18 for controlling operation of the capacitor hybrid fuel cell generator 3 is electrically coupled to the power circuit 4 by a controller circuit 17, which is located on the power circuit 4 between the capacitor bank 10 and the component circuit 15. A key switch contactor 17a is provided on the controller circuit 17 to couple or uncouple the controller assembly 18 from the power circuit 4. So configured, the balance of plant components 16 and the controller assembly 18 can be powered by electricity supplied by the capacitor bank 10.

A power connector 30 is provided on the positive conductor 28 between the component circuit 15 and the load 11 to couple and uncouple the power circuit from the load 11.

A capacitor voltage sensor 22 is positioned across the capacitor bank 10 to measure the voltage of the power circuit 4 at the capacitor bank 10. A power circuit current sensor 24 is positioned at the positive conductor 28 to measure the current of the power circuit 4, and when the contactor 26 is opened, the current of the capacitor bank 10.

A heater circuit 41 is provided to heat the coolant of the cooling system, and thereby heat the stack 7. The heater circuit 41 is in parallel with the fuel cell stack 7 between the stack 7 and the first contactor 26. The heating circuit includes at least one heater component 42 and a coolant temperature sensor 25 (shown in FIG. 4) configured to sense the temperature of the coolant of the cooling system. The heater component is preferably a resistor installed within a cooling circuit of the fuel cell stack 7, and positioned within the cooling circuit to heat the coolant near the coolant inlet to the fuel cell stack 7. Alternatively, the heater component 42 may be a resistor in a water passage in a humidifier or fluid management system in close association with the fuel cell stack, or it may be a hot air blower positioned to blow hot air onto the fuel cell stack, or it may be another type of heating apparatus installed to provide heat to the fuel cell stack. A third contactor 43 is provided to allow the heater circuit 41 to be isolated from the fuel cell stack 7. The third contactor 43 is electrically activated, and is under the control of the controller assembly 18.

Figure 4:
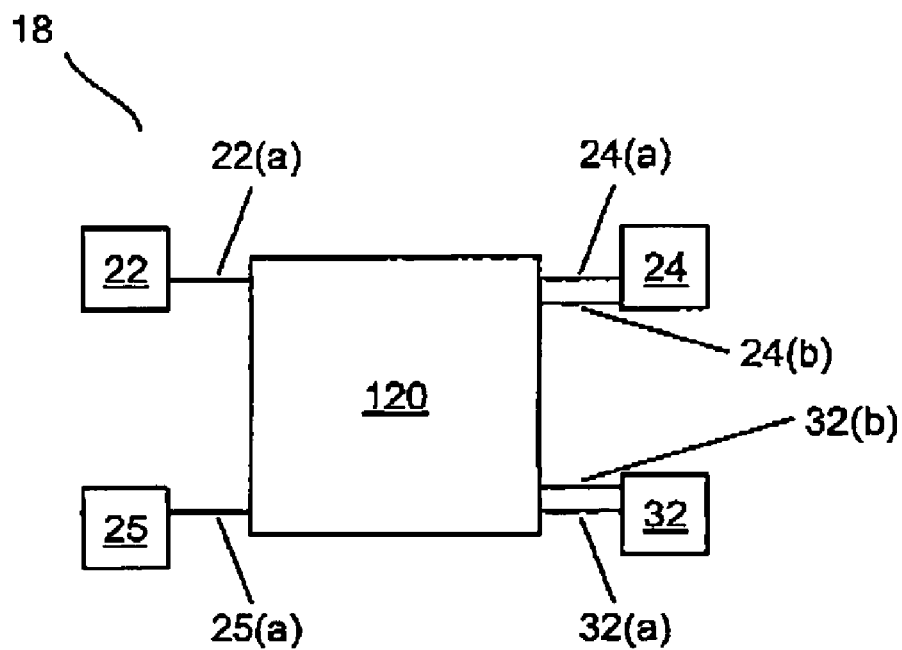
FIG. 4 is an electrical schematic of components of a controller assembly of the power generator.

Referring to FIG. 4, the controller assembly 18 includes a controller 120, a hydrogen gas leak sensor 32, and communication means to the capacitor voltage sensor 22, the power circuit current sensor 24 and the coolant temperature sensor 25. The controller 120 receives voltage data from the capacitor voltage sensor 22 via data line 22(a), and receives temperature data from the coolant temperature sensor 25 via data line 25(a). The controller 120 provides power to power circuit current sensor 24 by power supply line 24(b) and receives current data from same via data line 24(a). The controller 120 provides power to the hydrogen gas leak sensor 32 by power supply line 32(b) to provide power to the leak sensor, and communicates with same via data line 32(a).

Figure 5:
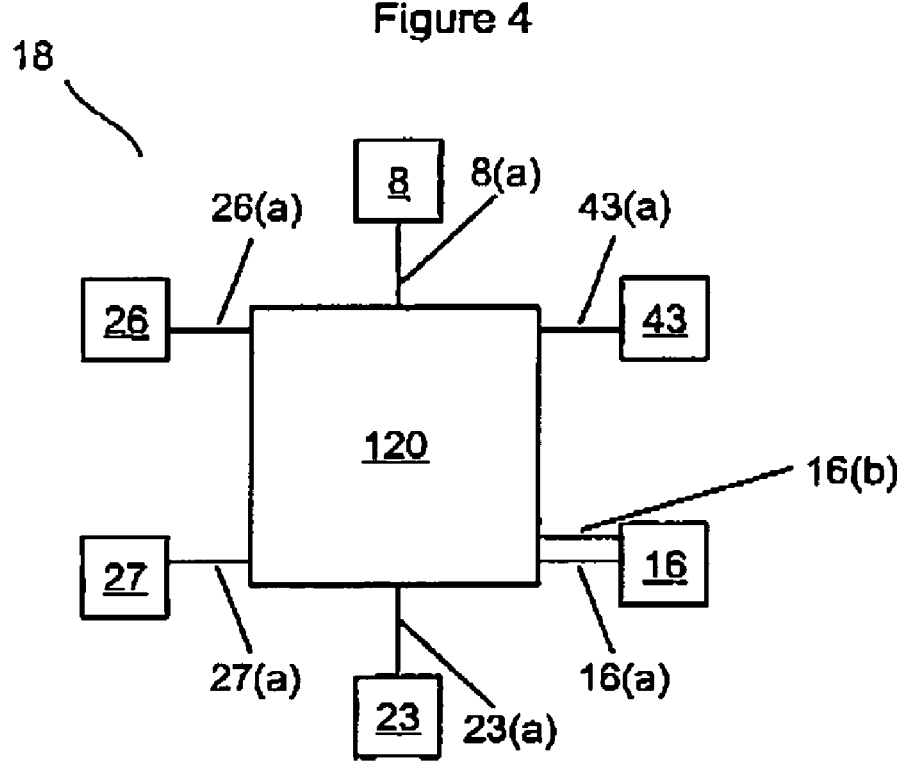
FIG. 5 is an electrical schematic of a controller of the controller assembly communicative with components of the power generator.

Referring to FIG. 5, the controller 120 receives voltage data from the stack voltage sensor 23 via data line 23(a). The controller 120 sends control signals to the first contactor 26 by control line 26(a), to the second contactor 27 by control line 27(a), to a fourth contactor 43 by control line 43(a), and to the voltage converter 8 by control line 8(a). The controller 120 also sends control signals to the balance of plant components 16 by control line 16(a), and receives data from balance of plant components by data line 16b.

The capacitor hybrid fuel cell generator 3 can include a key switch (not shown) that opens and closes a key switch contactor 17a. The key switch contactor 17a is closed when the key switch is set to an "On" position, and is open when the key switch is set to an "Off" position. The generator 3 is ready to operate as long as fuel is available to the fuel cells, and the key switch contactor 17a is closed. When ready to operate, the generator 3 can start up the fuel cell stack 7 as required.

Capacitor Bank

Figure 6:
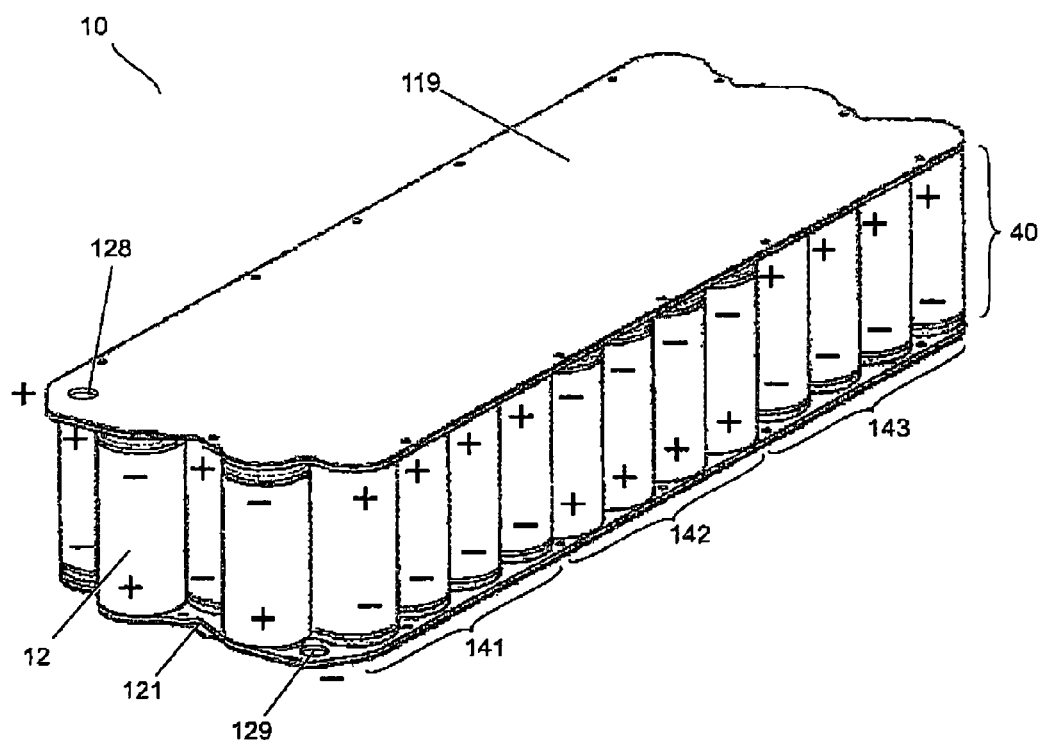
FIG. 6 is a perspective view of a capacitor bank of the generator.

Referring to FIG. 6, the capacitor bank 10 comprises a plurality of capacitors 12 arranged in an array 40. The capacitor array 40 is sandwiched between a positive assembly 119 and a negative assembly 121. Power is conducted to and from the capacitor bank 10 via positive and negative terminals 128, 129 on the positive and negative assemblies 120, 121.

The negative assembly 121 is largely the mirror image of the positive assembly 119, with the outer surface of the positive assembly 119 forming the first outer surface of the capacitor bank 10 and the outer surface of the negative assembly 121 forming the second outer surface of the capacitor bank 10, in which the second outer surface is parallel to the first outer surface.

Each capacitor is a cylindrical double-layer type capacitor, having a flat positive contact at one end, and a flat negative contact at the opposite end. A suitable such capacitor is sold by Maxwell Technologies under the brand name Boostcap, part number BCAP2600-E270-T05. The Bootscap capacitor is rated at 2.7 Volts, 600 Amps, 2600 Farad, and is 138 mm long and 57.7 mm in diameter. Other capacitors of a different voltage, energy storage capability and/or dimensions could be used within the scope of the invention, provided that all of the capacitors within the capacitor array are of comparable voltage rating, having comparable energy storage capability, and have comparable length.

The capacitors 12 are arranged in an offset row pattern in a single plane to minimize volume. The capacitors 12 are grouped into multiple series-connected groups, namely: a first capacitor group 141, a second capacitor group 142, and a third capacitor group 143. Additional groups can be provided within the scope of the invention. Each group 141, 142, 143 consists of the same number of capacitors. The capacitors 12 within a capacitor group 141, 142, 143 are connected in parallel to provide greater energy storage capability. Where the current capability of one capacitor is 600 Amps; grouping such capacitors into groups of four capacitors provides an energy storage capability of 2,400 Amps. The number of capacitors 12 in a group can be altered within the scope of the invention, and depends on the required energy storage capability of the capacitor bank 10. The capacitor groups 141, 142, 143, are connected in series to adjacent capacitor groups to increase the voltage of the array 40.

Figure 7:
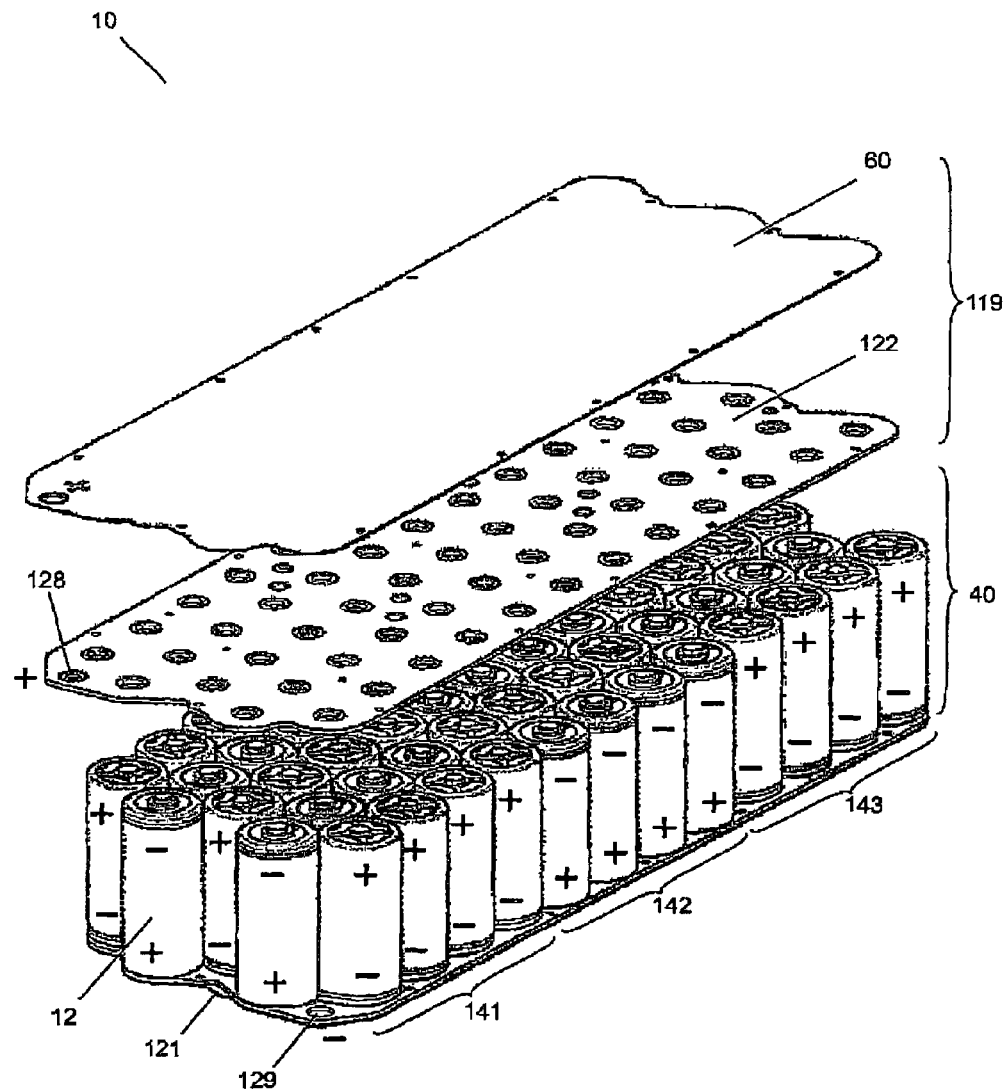
FIG. 7 is an exploded perspective view of the capacitor bank.

Referring to FIG. 7, the positive assembly 119 includes a first circuit board 60, a first bus bar assembly 122 and the positive terminal 128.

Figure 8:
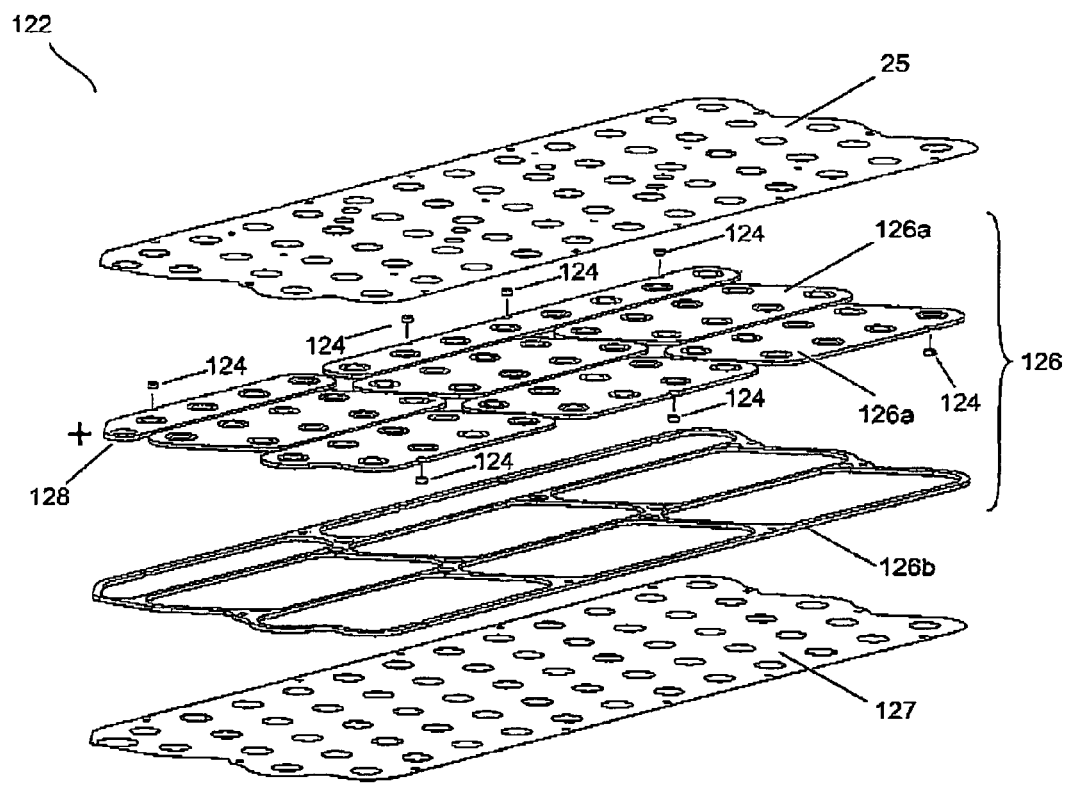
FIG. 8 is an exploded perspective view of a positive assembly of the capacitor bank.

Referring to FIG. 8, first bus bar assembly 122 comprises an outer insulating layer 125, a positive bus bar layer 126, a positive inner insulating layer 27 and bus bar spacers 24. The positive bus bar layer 126 includes a plurality of bus bars 126a and an insulating frame 126b. The layers 125, 126, 127 are laminated together to form the first bus bar 122 assembly.

Figure 9:
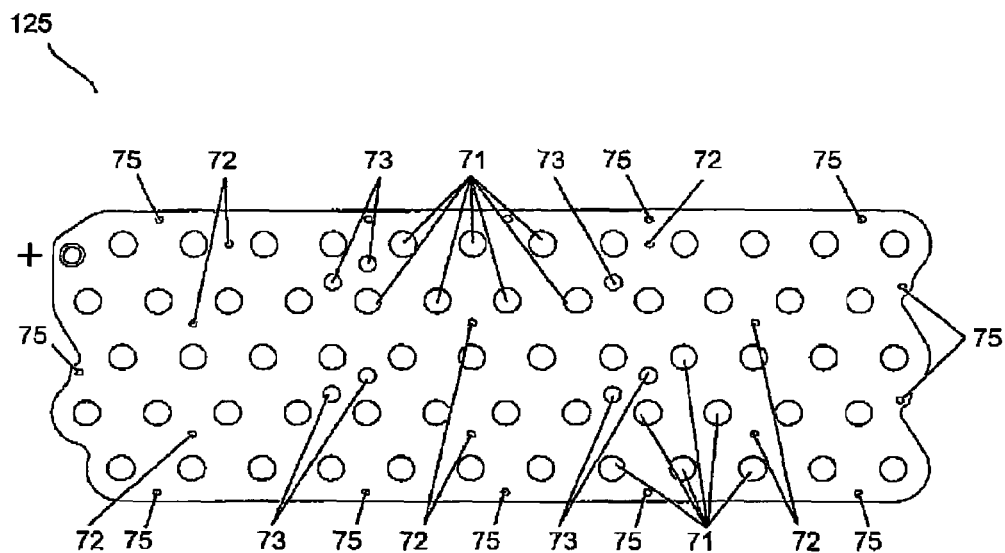
FIG. 9 is a top plan view of a positive outer insulating layer of the positive assembly.

Referring to FIG. 9, the outer insulating layer 125 is comprised of electrically insulating material and contains welding access holes 71 that allow welding access to the capacitors' contacts and to the bus bars 126a. The outer insulating layer 125 also contains contact point access holes 72, cutouts 73, and fastener holes 75. The contact point access holes 72 are provided to allow balancing circuit contact points (not shown) from outside the first bus bar assembly 122 to contact the bus bars 126a. The cutouts 73 are provided to allow non-contact positioning of electronic components (not shown). The fastener holes 75 are provided for installation of the capacitor bank 10 in the generator 3.

Figure 10:
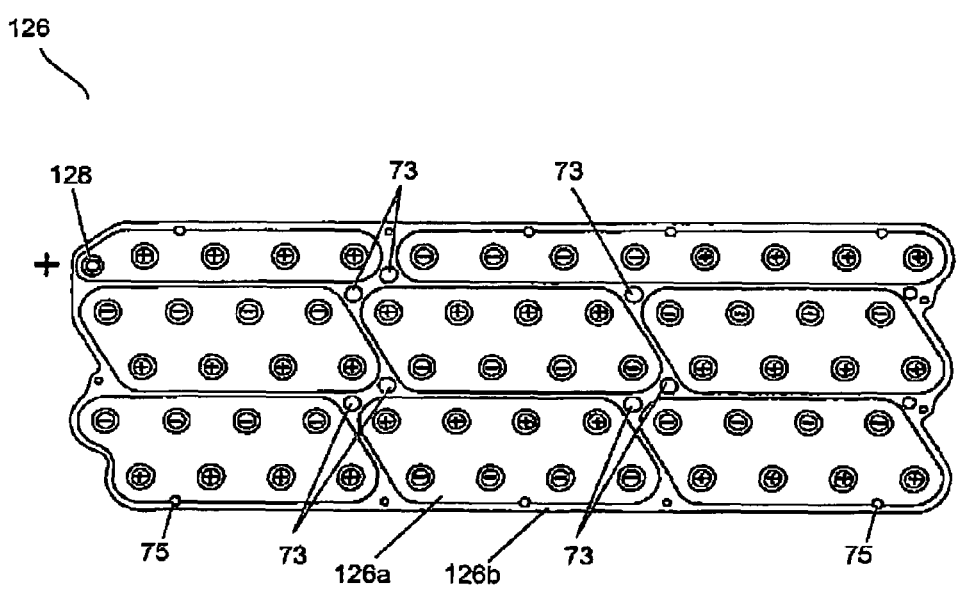
FIG. 10 is a top plan view of a positive conductor set in a frame of the positive assembly.

Referring to FIG. 10, the positive bus bar layer 126 comprises the plurality of bus bars 126a and the insulating frame 126b that holds the bus bars in place, and that isolates the bus bars from each other. Each bus bar 126a connects the capacitors 12 of a capacitor group in parallel. One bus bar 126a contains the positive terminal 128 and is connected to the positive end of the series of capacitor groups. One bus bar 126a contains the negative terminal 129 and is connected to the negative end of the series of capacitor groups. All other bus bars 126a connect the positive end of one capacitor group to the negative end of an adjacent capacitor group in order to connect all of the capacitor groups in series. The insulating frame 126b contains the same cutouts 73 as the outer insulating layer 125 to allow the non-contact positioning of electronic components (not shown). The insulating frame 126b contains fastener holes 75 that correspond to fastener holes 75 on the outer insulating layer 125.

Figure 11:
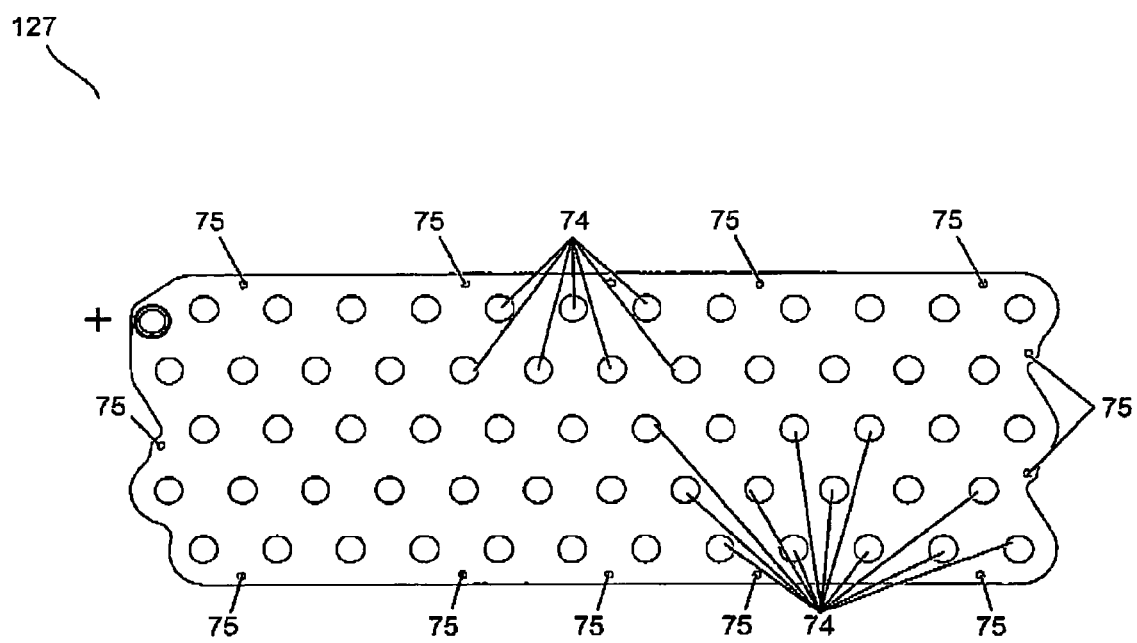
FIG. 11 is a top plan view of an insulating layer of the positive assembly.

Referring to FIG. 11, the positive inner insulating layer 27 is comprised of electrically insulating material and contains contact access holes 74 that allow the capacitors' contacts to contact the bus bars 126a. The positive inner insulating layer 27 also contains fastener holes 75 that correspond to fastener holes 75 on the outer insulating layer 125.

Figure 12:
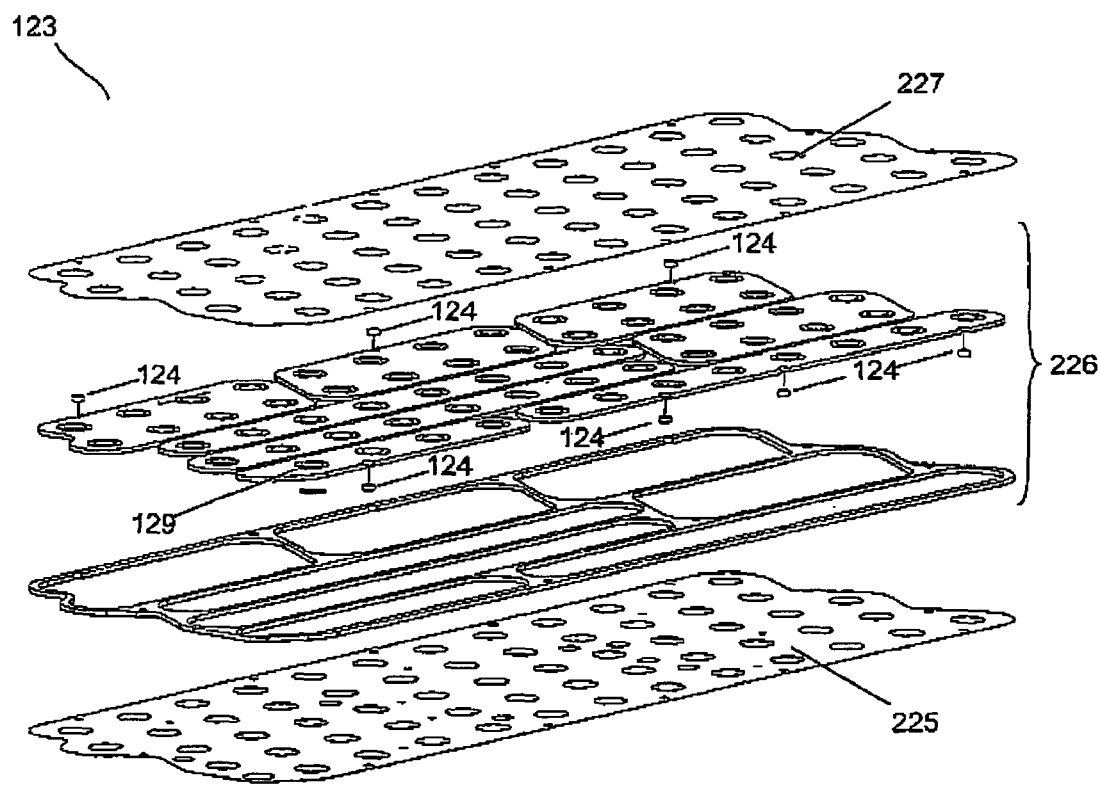
FIG. 12 is an exploded perspective view of a negative assembly of the capacitor bank.

Referring to FIG. 12, the second bus bar assembly 123 of the negative assembly includes an outer insulating layer 225, a negative bus bar layer 226, an inner insulating layer 227 and bus bar spacers 124. The negative bus bar layer 226 includes a plurality of bus bars 226a and an insulating frame 226b. The layers 225, 226, 227 are laminated together to form the second bus bar 123 assembly. The second bus bar assembly 123 is largely the mirror image of the first bus bar assembly 122.

Figure 13A:
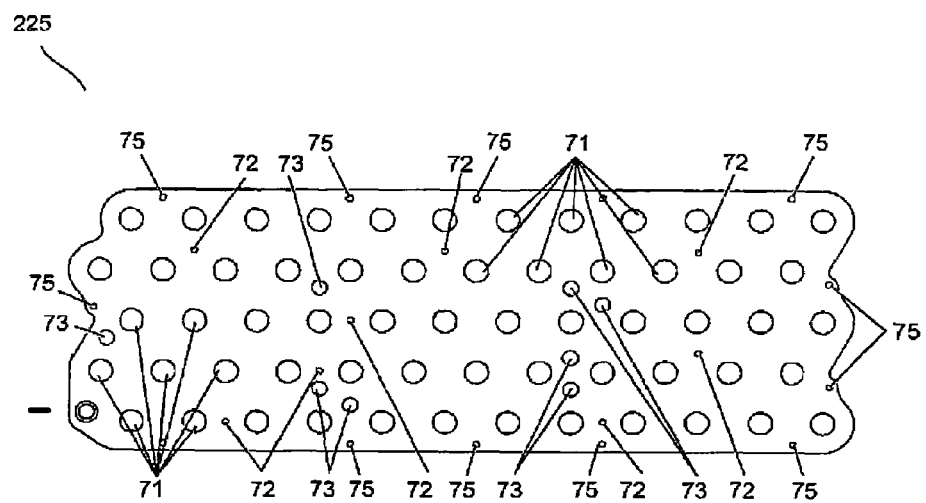
FIGS. 13(a) to (c) are top plan views of components of the negative assembly.
Figure 13B:
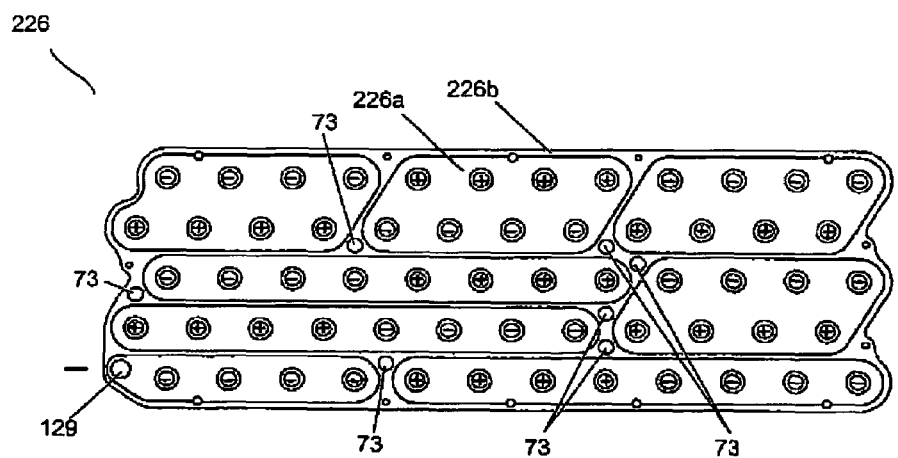
Figure 13C:
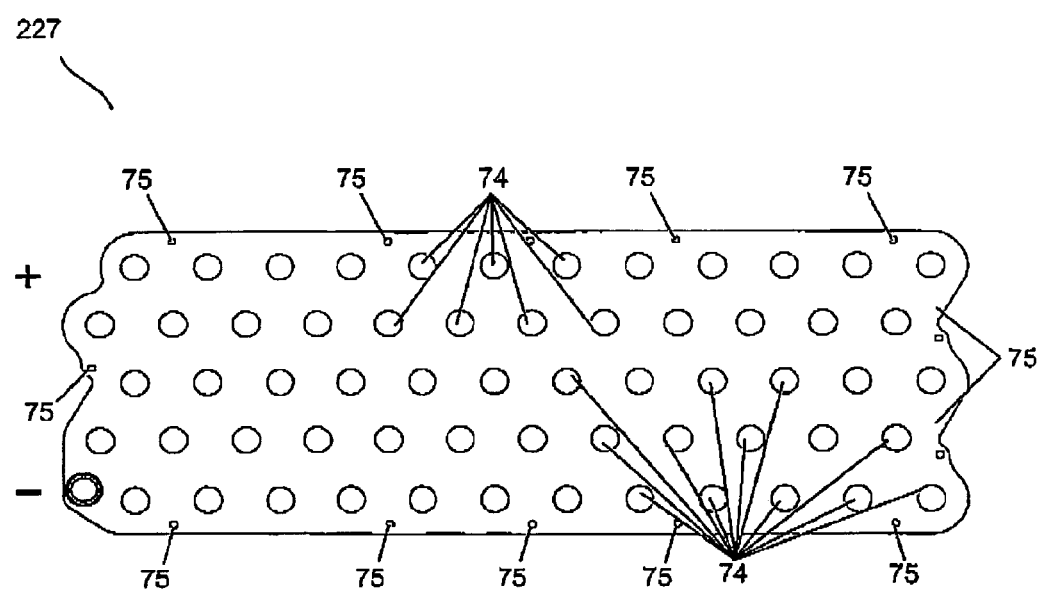

FIGS. 13(*a*) to 13(*c*) illustrates the outer insulating layer 225, the negative bus bar layer 226 and the negative inner insulating layer 227 of the second bus bar assembly 123. The bus bars 126(*a*), 226(*a*) of the positive and negative assemblies are configured to define a continuous electrical pathway that electrically couples all of the capacitors together, from the negative terminal 129 in the negative assembly to the positive terminal 128 in the positive assembly.

The edge shapes of the first and second bus bar assemblies 122, 123 closely follow the edge shape of the capacitor array 40 to minimize the total volume of the capacitor bank 10, and to allow nesting of the capacitor bank 10 with other fuel cell power pack hardware.

The positive and negative terminals 128, 129 are arranged on the laminated bus bars without projecting beyond the top and bottom surfaces of the capacitor bank 10 to minimize the maximum thickness dimension of the capacitor bank 10.

Figure 14A:
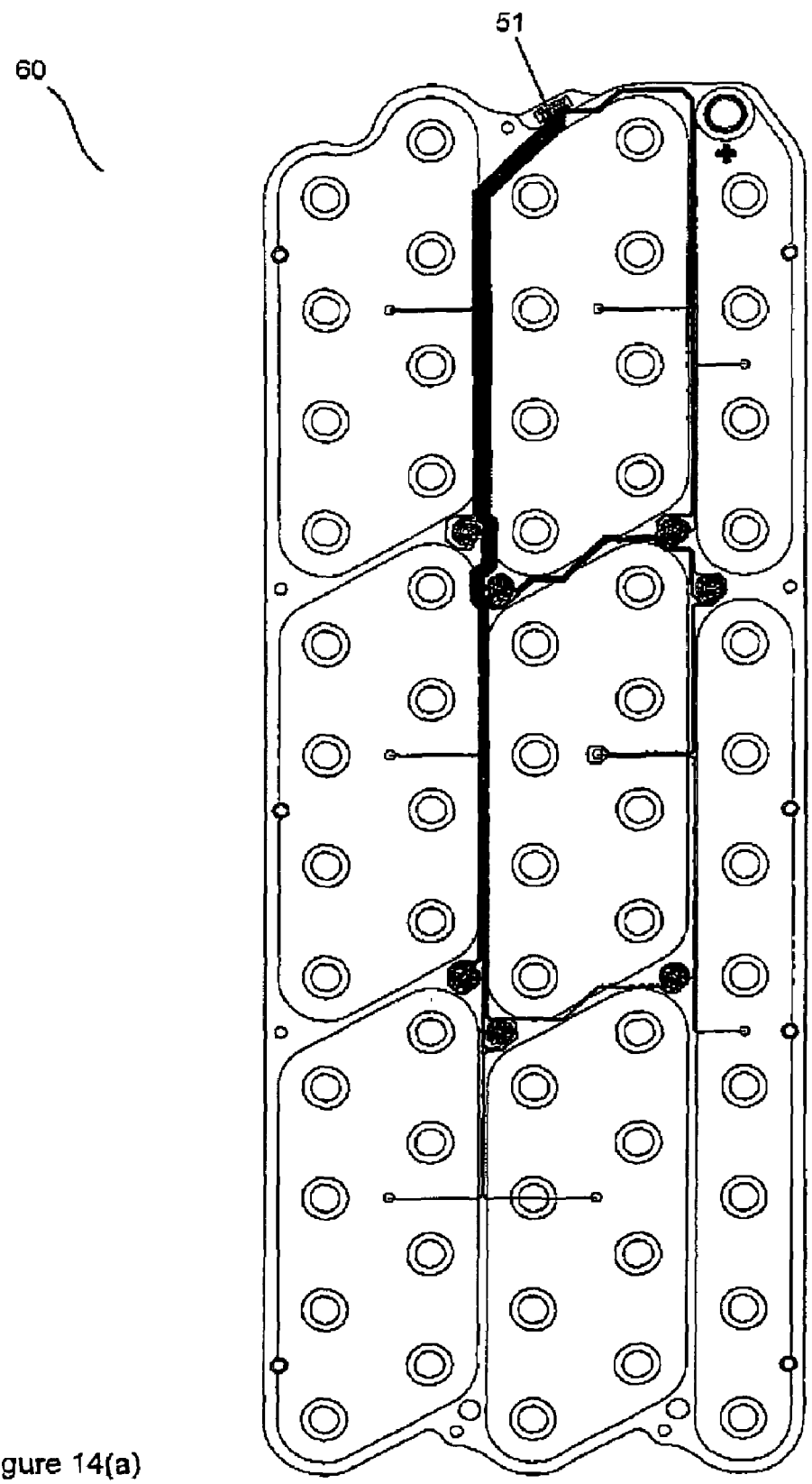
FIGS. 14(a) and (b) are top plan views of first and second circuit boards of the capacitor bank.
Figure 14B:
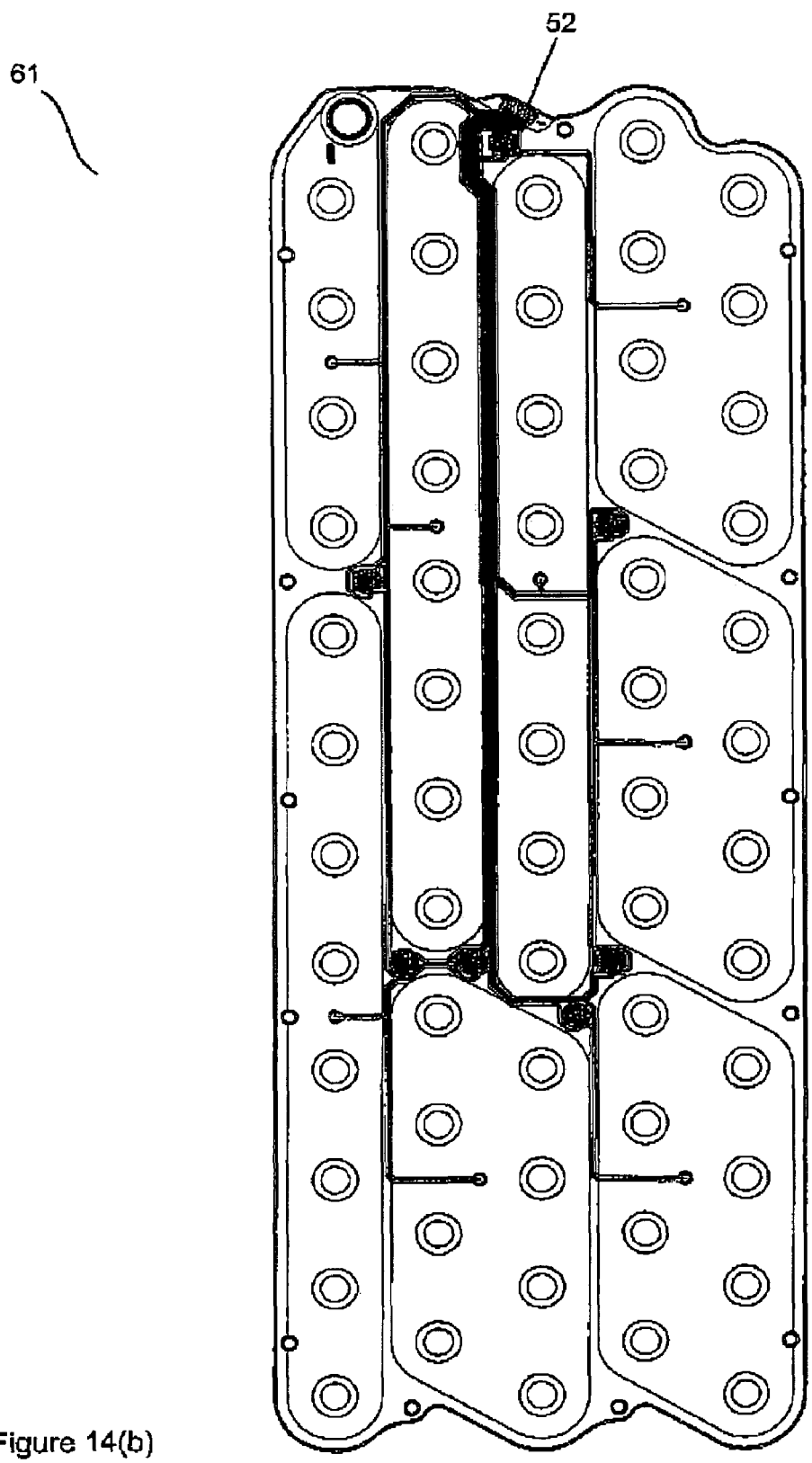

Referring to FIGS. 14(*a*) and (*b*), a first circuit board 60 includes first connector 51 and a second circuit board 61 includes a second connector 52, the connectors 51, 52 allowing for an interconnection that serves to connect the circuitry of the two circuit boards 60, 61. Additionally, the connectors 51, 52 allow for connections to the controller 120 for transferring data collected through sensors coupled to the circuit boards, especially the capacitor voltage sensor 22.

The circuit boards 60, 61 include an insulating sub-layer (not shown) and a conductive sub-layer (not shown), as is typical of circuit boards. The circuit boards 60, 61 are installed on the capacitor bank 10 such that the insulating sublayer is the outer surface of the capacitor bank 10, and the conductive sublayer is in contact with the bus bar assemblies 122, 123 respectively. The insulating sublayer serves to protect and insulate the electrical interconnections in the capacitor bank 10.

Figure 15A:
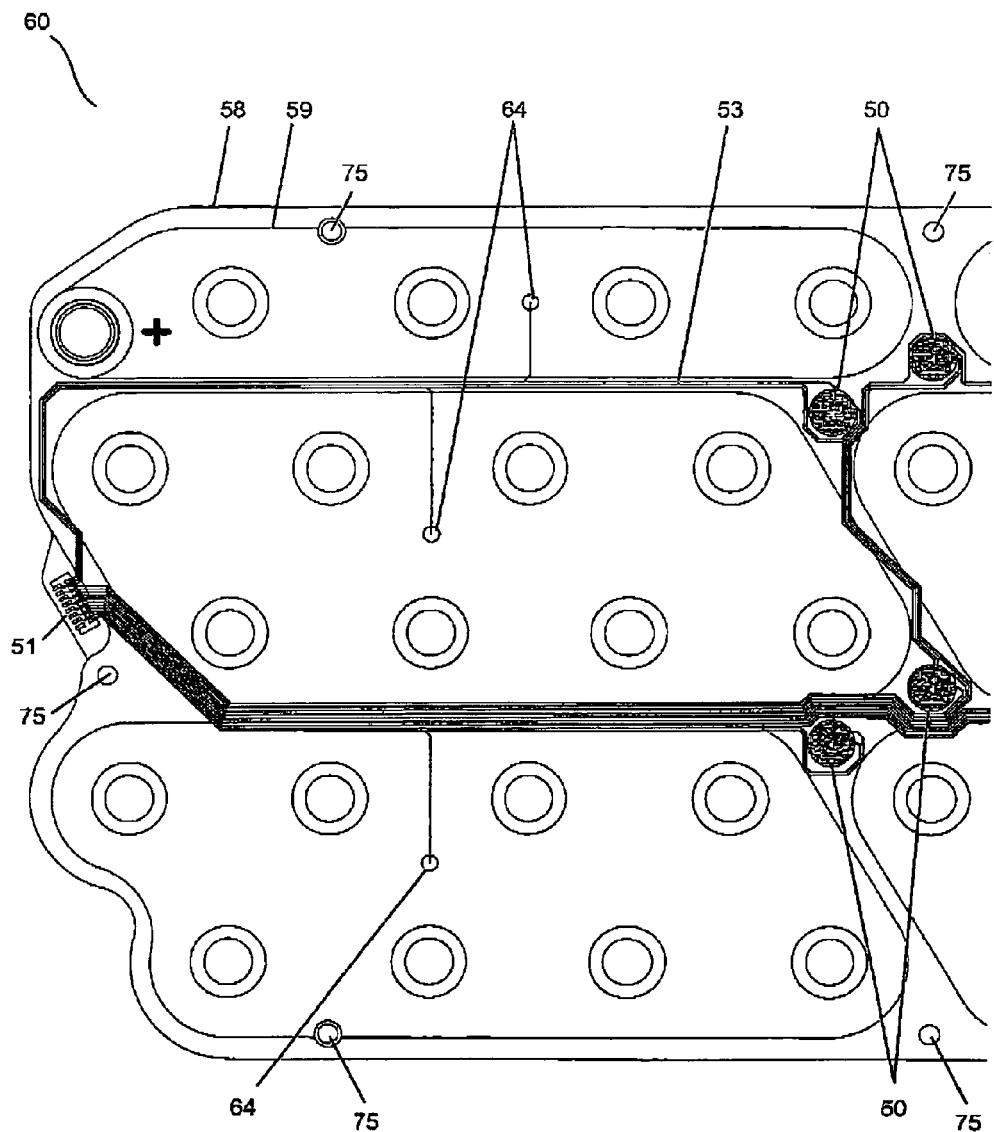
FIGS. 15(a) and (b) are magnified views of the circuit boards shown in FIGS. 14(a) and (b).
Figure 15B:
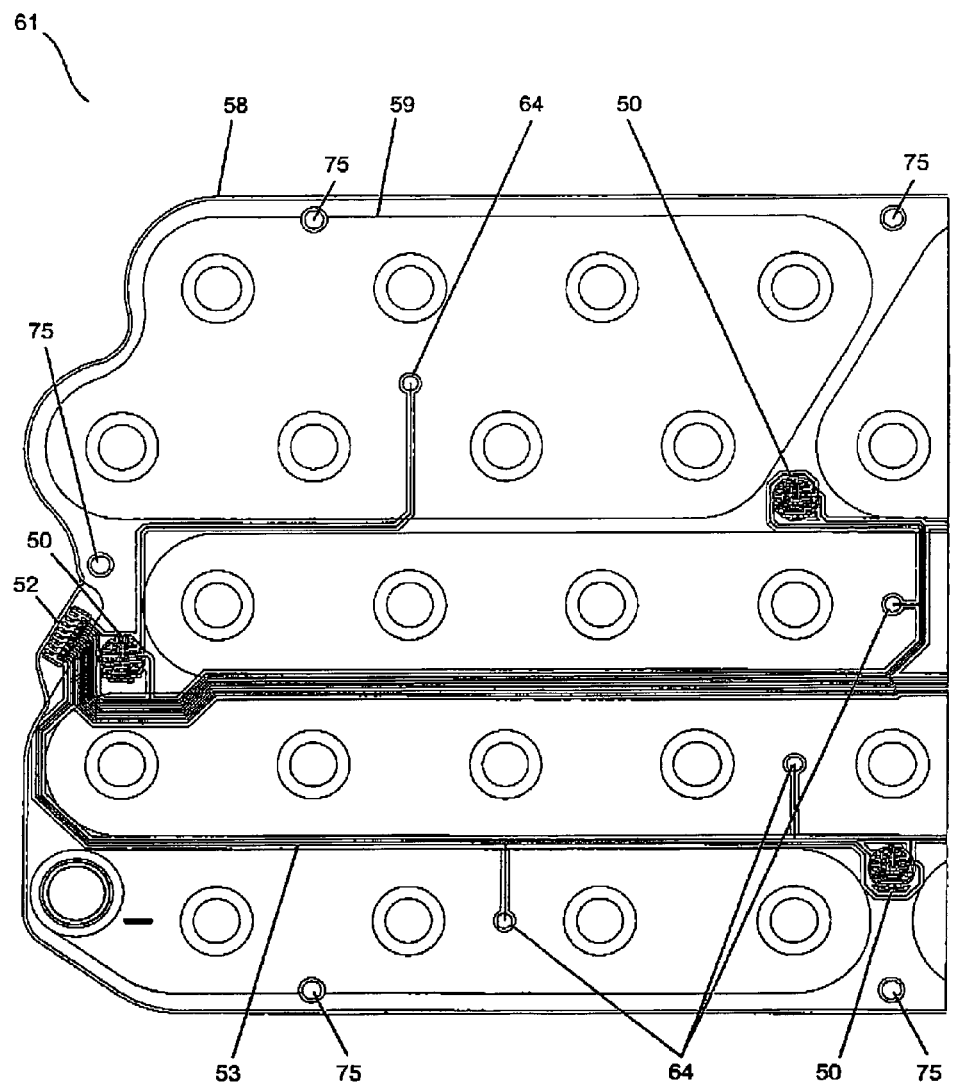

Referring to FIGS. 15(*a*) and (*b*), there is provided on the first circuit board 60 a plurality of voltage balancing circuits 50, a plurality of voltage balancing traces 53, the first connector 51 and a plurality of balancing circuit contact points 64. (The circuit board outline 58 and the bus bar assembly outline 59 are included in the figure to show the relative locations of the capacitors and the bus bars). The second circuit board 61 includes multiple voltage balancing circuits 50, voltage balancing traces 53, the second connector 52 and a plurality balancing circuit contact points 64. (The circuit board outline 58 and the bus bar assembly outline 59 are included in the figure to show the relative locations of the capacitors and bus bars).

The circuit board 60, 61 includes balancing circuit contact points 64 to electrically connect to bus bars 126a and thereby acquire a voltage value of the connected capacitor group. The balancing circuit contact points 64 are arranged one for each bus bar 126a to provide a voltage sensing capability for the voltage balancing circuits 50. The voltage balancing circuit 50 compares the voltage signals of two bus bars connected to a capacitor group to determine the voltage across the capacitor group. The voltage balancing circuits 50 are positioned on the circuit boards 60, 61 to correspond with cutouts 73 in the bus bar assemblies 122, 123 respectively, such that there is no contact between the voltage balancing circuits 50 and the bus bars. The voltage balancing traces 53 are routed on the circuit boards 60, 61 to largely correspond with the insulating frames 126b, 226b respectively in order to avoid electrical interference from conductive components, such as the bus bars 126a, 226a and the capacitors 12.

The first connector 51 of the first circuit board 60 and the second connector 52 of the second circuit board 61 are provided to accept a ribbon cable (not shown) for interconnection of voltage balancing traces 53 of the first circuit board 60 and the voltage balancing traces 53 of the second circuit board 61. This interconnection provides serial connection between adjacent capacitor groups.

Figure 16:
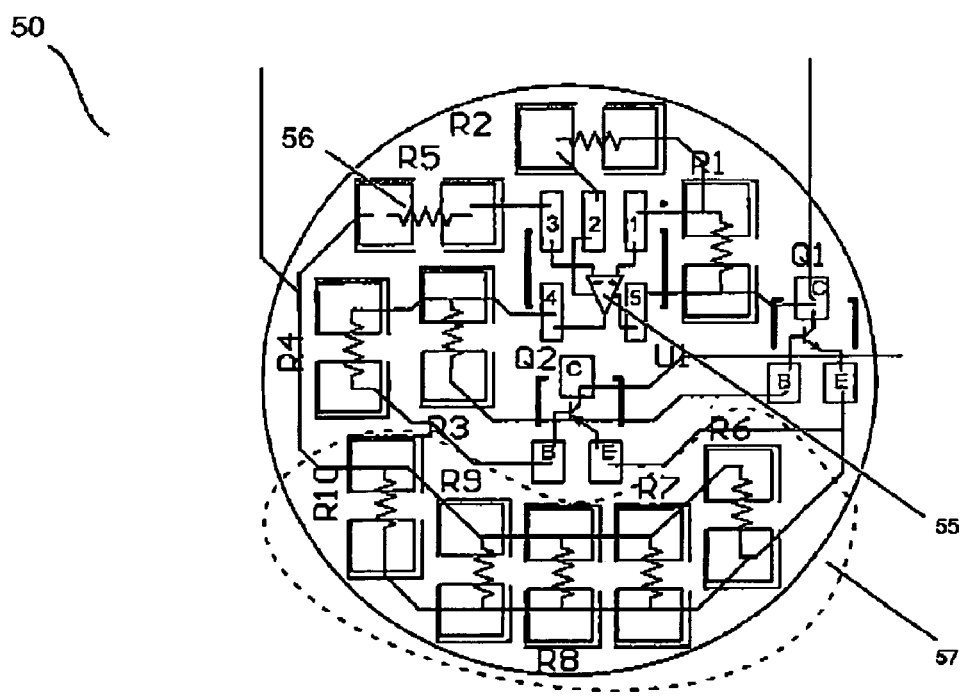
FIG. 16 is a top plan view of a voltage balancing circuit of the circuit board.

Referring to FIG. 16, the voltage balancing circuit 50 includes a voltage divider 54, an operational amplifier 55, a negative feedback resistor 56, and a current limiting resistor 57. The voltage balancing circuit 50 operates automatically to balance the voltage of one capacitor group with respect to the adjacent capacitor group. The voltage balancing circuit 50 does not require a controller to operate.

In assembly, the balancing circuit contact points 64 are preferably bonded to the respective bus bars 126a using a conductive adhesive. The remainder of the circuit board 60, 61 is preferably bonded to the respective bus bars assembly 122, 123 using a non-conductive adhesive.

A capability of the voltage balancing circuit 50 is diagnosis of the health of series-connected capacitors 12 or capacitor groups. When the voltage drop across a capacitor 12 or a capacitor group reaches or drops below a predetermined voltage drop level, the voltage balancing circuit 50 reports the voltage drop to the controller 120. The controller 120 may be programmed to shut down or alter generator 6 operation, or report the capacitor 12 or capacitor group for replacement or repair. Additionally, a micro-processor may be included on the circuit board, the micro-processor configured to condition the voltage data, and to transmit the conditioned voltage signals to the controller 120 for the same purposes.

Capacitors 12 have a maximum operating temperature above which the capacitor becomes damaged. A temperature sensing method is advantageously included in a capacitor bank 10 to prevent capacitor overtemperature. The circuit board 60 may include a temperature sensor (not shown) arranged to sense the temperature of one or more capacitors 12, for example by direct contact with a capacitor, or by sensing the air around a capacitor. Temperature signal circuitry (not shown) on the circuit board 60, 61 can be included to transmit the temperature data to the controller 120. Additionally, a micro-processor may be included on the circuit board, the micro-processor configured to condition the temperature data.

A flexible electronic circuit (not shown) may be used instead of a circuit board within the scope of the invention. The flexible circuit can be bonded onto the lamination layer either during manufacture of the laminated layers, or after lamination of the layers and before assembly of the capacitor bank 10. Assembly of the capacitor bank 10 implements contact between the capacitors 12 and a flexible electronic voltage balancing circuit 50 without additional manufacturing steps. Flexible electronic circuits, for example as sold by Flexible Circuit Technologies, Inc., comprises electronic circuitry within a flexible material.

Assembly

As described above, the capacitor array 40 is coupled between the first and second bus bars assemblies 122, 123. Preferably, the capacitor contacts are welded to the respective bus bars 126a of the bus bar layers 126, 226. The preferred welding method is numerically controlled laser welding; however another welding method can be used within the scope of the invention. Cost is reduced by the use of computer controlled laser welding process to automatically and accurately make the high power electrical connections in the capacitor bank. An advantage of welding capacitors to laminated bus bars is that the welded assembly provides a stiff and rugged structure that requires no additional structural elements, and which resists shock and vibration. Also, the welded assembly has no projections beyond the flat outer surfaces of the positive and negative assemblies 120, 121. Further, use of a laser welding to affix the capacitors to the bus bar assembly eliminates many nuts, washers and threading operations that would be necessary with bolted fasteners.

The first circuit board 60 is bonded to the first bus bar assembly 122 to complete the positive assembly 119, and the second circuit board 61 is bonded to the second bus bar assembly 123 to complete the negative assembly 121.

The compact nature of the capacitor array 40, the use of substantially planar bus bar assemblies, and the use of laser welding to affix the capacitors to the bus bar assembly produce a particularly compact capacitor bank 10.

Forming a Capacitor Bank Assembly

The capacitor bank 10 can be vertically stacked on each other and can be electrically connected in parallel or in series using interconnection hardware to form a capacitor bank assembly. The capacitor bank 10 can be connected in series with additional capacitor banks 10 to provide increased voltage, and can be connected in parallel with additional capacitor banks 10 to provide increased energy storage capability. Or, groups of series-connected capacitor banks 10 can be coupled in parallel, or groups of parallel connected capacitor banks 10 can be connected in series. The compactness of each capacitor bank 10, and especially the substantially planar surfaces of the positive and negative assemblies, enables the capacitor banks 10 to be stacked to produced a relatively compact capacitor bank assembly.

Figure 17A:
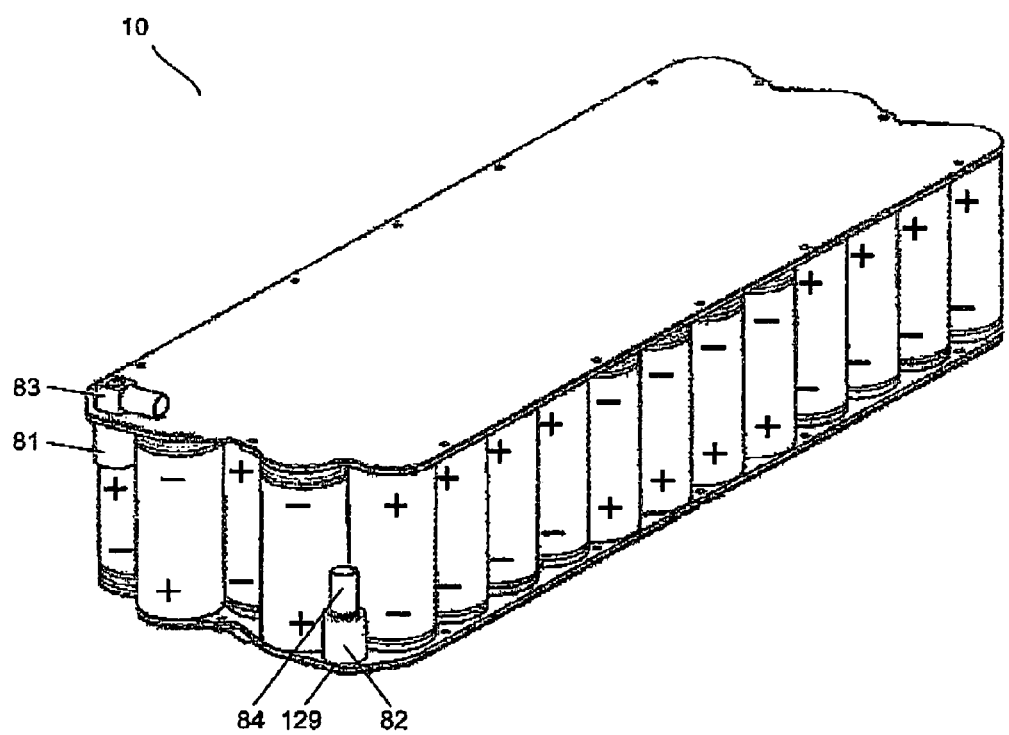
FIGS. 17(a) and (b) are perspective views of the capacitor bank with stacking connectors and interconnection hardware.
Figure 17B:
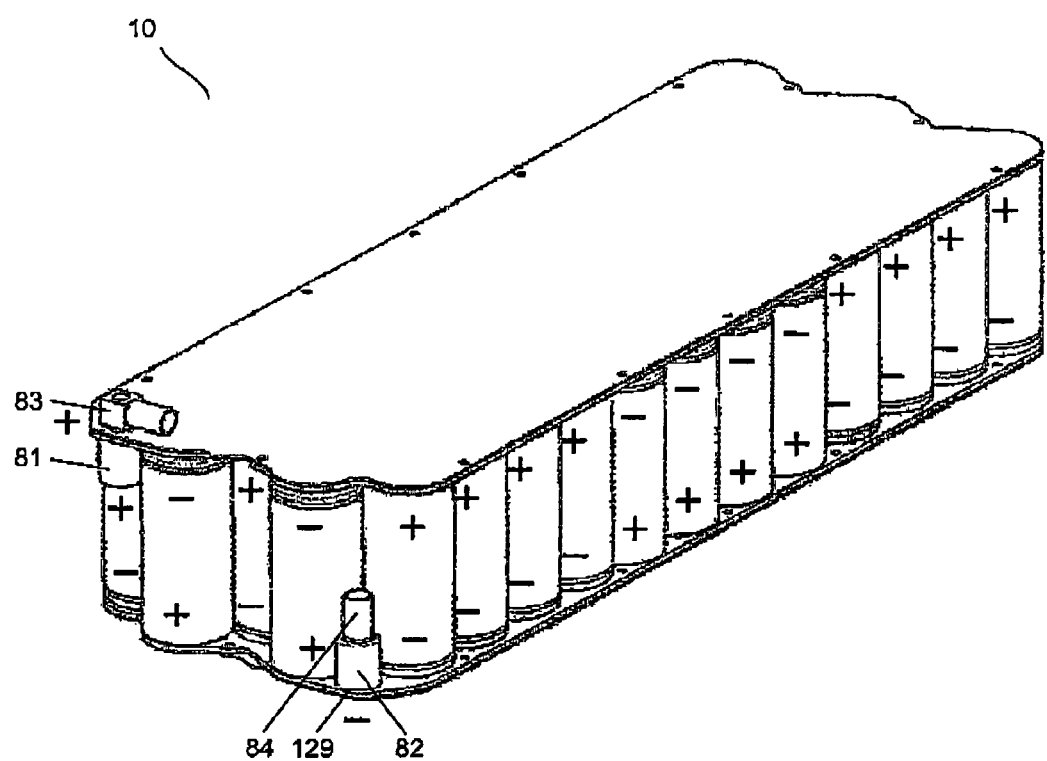

Referring to FIGS. 17(a) an (b), the interconnect hardware is a hyperboloid socket and pin style electrical contact system 81, 82, 83, 84 attached to positive and negative terminals of the capacitor bank 10. Suitable hyperboloid socket and pin style electrical contact system are sold by RADSOK Amphenol under the descriptor RADSOK terminal. To accommodate for the Radsok terminal grid, a positive terminal extension 81 is welded to the bus bar 36a that contains the positive terminal 28, and a negative terminal extension 82 is welded to the bus bar 136a that contains the negative terminal 29. In a first configuration shown in FIG. 17(a), a first terminal pin 83 is inserted into the positive terminal extension 81 to provide a positive power cable connection point to the positive terminal 28, and a second terminal pin 84 is inserted into the negative terminal extension 82 to provide a negative power cable connection point to the negative terminal 29. Each of the pins 83, 84 can be configured to extend either parallel or perpendicular to the positive and negative assemblies. For example, in FIG. 17(a), the first pin 83 extends parallel to the positive assembly and the second pin 84 extends perpendicularly to the negative assembly. In FIG. 17(b), both pins 83, 84 extend perpendicularly to their respective terminals.

Figure 18:
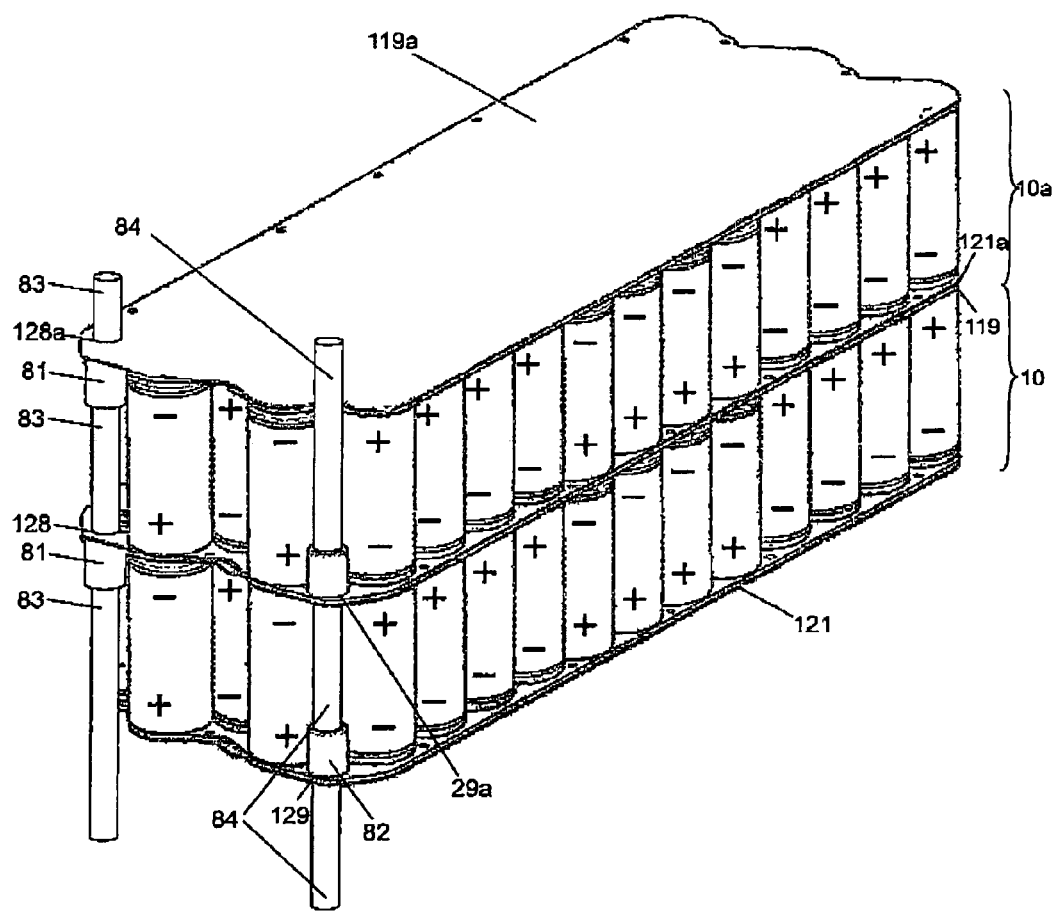
FIG. 18 is a perspective view of two capacitor banks vertically stacked together in parallel.

As the terminal pins 83, 84 can be oriented parallel or perpendicular to the assemblies, the positive and negative terminals 128, 129 of the capacitor bank 10 can easily be connected in parallel or in series with the positive and negative terminals of another capacitor bank or modules. FIG. 18 shows two capacitor banks 10, 10a electrically coupled in parallel. The two capacitor banks 10, 10a are stacked in the same orientation, so that the positive assembly 119 of the first capacitor bank 10 contacts the negative assembly 121a of the second capacitor bank 10a. The first terminal pin 83 is inserted through the positive terminal extensions 81 of the two capacitor banks 10, 10a to electrically couple the positive terminals 28, 28a of the two capacitor banks 10. The second terminal pin 84 is inserted through the negative terminal extensions 82 of the two capacitor banks 10, 10a to electrically couple the negative terminals 129, 129a of the two capacitor banks 10, 10a. A load (not shown) can be coupled to each terminal pin 83, 84. Additional capacitor banks (not shown) can be stacked in the same manner for connecting in parallel, with each bank 10 in the same orientation as in adjoining banks 10.

Figure 19:
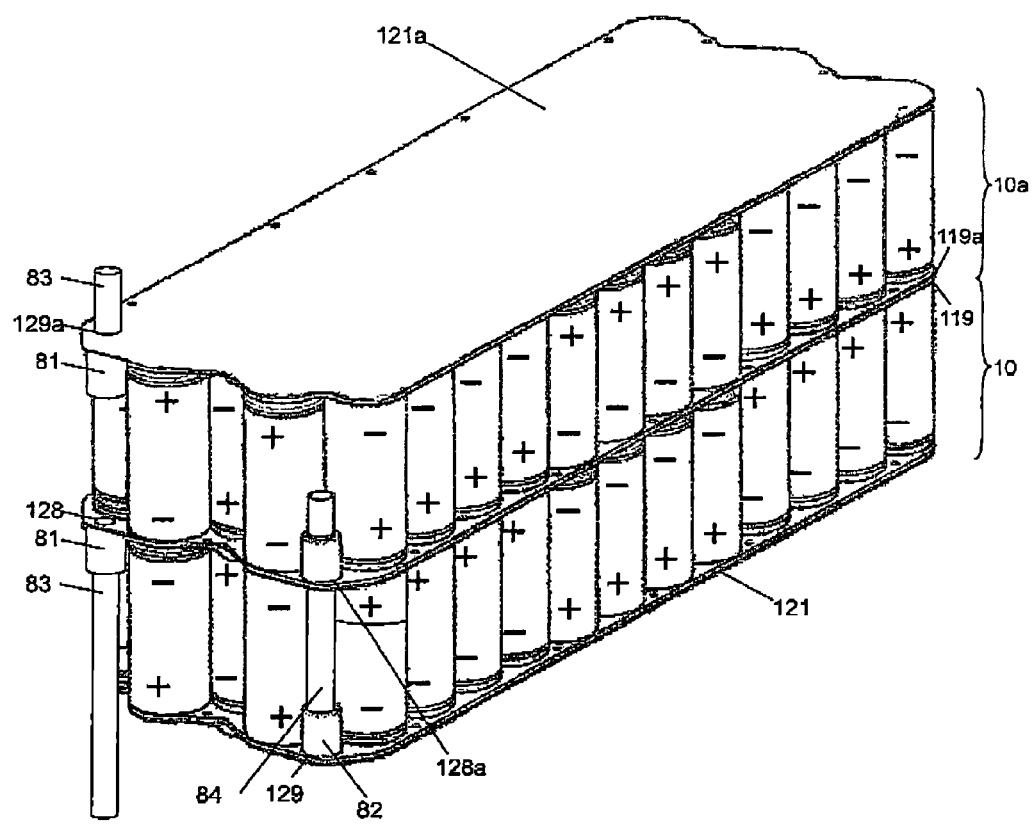
FIGS. 19 and 20 are perspective views of two capacitor banks vertically stacked together in series.

FIG. 19 shows two capacitor banks 10 and 10a electrically coupled in series. The capacitor banks 10, 10a are stacked such that the positive assembly 119 of the first capacitor bank 10 contacts the positive assembly 119a of the second capacitor bank 10a. The first terminal pin 83a is coupled to the positive terminal extension 81 of the first capacitor bank 10 and can be coupled to one end of the load. A second terminal pin 84a couples the negative terminal extension 82 of first capacitor bank 10 with the positive terminal extension 82 of the second capacitor bank 10a. Another first terminal pin 83a is coupled to the terminal extension of the second capacitor bank 10a and can be coupled to the other end of the load.

Figure 20:
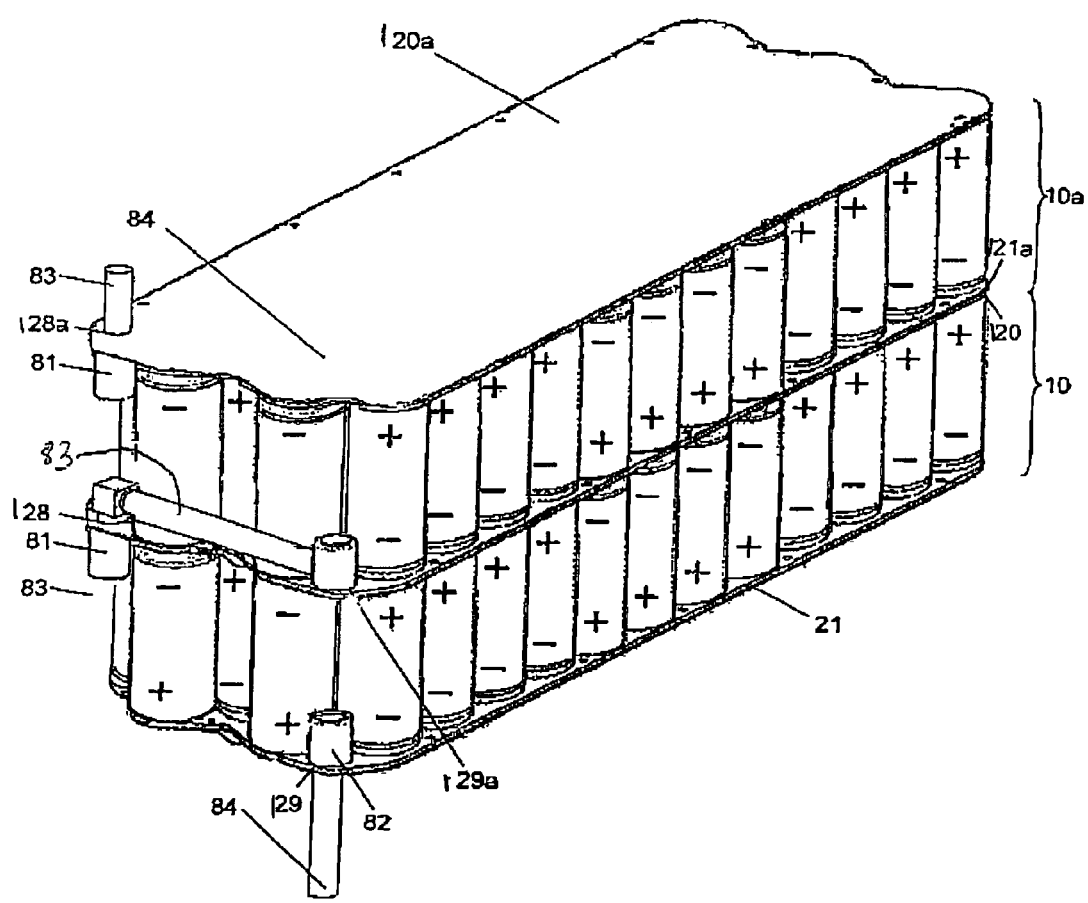

FIG. 20 shows two capacitor banks 10, 10a electrically coupled in series. Unlike the configuration shown in FIG. 19, the capacitor banks 10, 10a are stacked such that the positive assembly of the first capacitor bank 10 contacts the negative assembly of the second capacitor bank 10a. Coupling the two banks 10, 10a in series necessitates the use of a parallel extending terminal pin 83 to connect the positive terminal pin 81 of the first capacitor bank 10 with the negative terminal pin 82 of the second capacitor bank 10a.

As can been in the configurations shown in FIGS. 18-20, the capacitor banks 10 can be coupled together in a number of different ways. Groups of parallel-connected capacitor banks 10 can be stacked in series, with each group of parallel-connected capacitor banks 10 stacked upside down with respect to the adjoining group of parallel-connected capacitor banks 10. Alternatively, groups of series-connected capacitor banks 10 can also be stacked in parallel, with each group of series-connected capacitor banks 10 stacked in the same orientation as adjoining groups of series-connected capacitor banks 10. Also, groups of series-connected capacitor banks 10 can be coupled in parallel, and vice versa. These various coupling options enable a number of different configurations, thereby providing a highly customizable capacitor bank assembly to suit the particular needs of the electrical power generator. Building a capacitor bank assembly from multiple such capacitor banks 10 is expected to be easier and less expensive than custom manufacturing a capacitor bank assembly for different applications.

It is to be understood that even though various embodiments and advantages of the present invention have been set forth in the foregoing description, the above disclosure is illustrative only, and changes may be made in detail, and yet remain within the broad principles of the invention. Therefore, the present invention is to be limited only by the claims appended to the patent.

We claim:

1. A capacitor bank for an electrical power generator, comprising
   (a) a positive assembly having a substantially planar outer surface and a positive electrical terminal;
   (b) a negative assembly having a substantially planar outer surface and a negative electrical terminal;
   (c) at least one capacitor sandwiched between and electrically coupled to the positive and negative assemblies; and
   (d) electrical interconnects coupled to each of the terminals and for coupling to a load or to another capacitor bank; the positive and negative assemblies of the capacitor bank each being stackable on a positive or negative assembly of another capacitor bank to form a capacitor bank assembly.

2. A capacitor bank as claimed in claim 1 wherein the positive and negative terminals are located at the perimeter of their respective assemblies, such that the interconnects extend along the perimeter of the capacitor bank to couple to terminals of an adjacent stacked capacitor bank.

3. A capacitor bank as claimed in claim 2 wherein the interconnects comprise a hyperboloid socket and an electrical contact pin coupled to the socket and that extends to couple with a hyperboloid socket of another interconnect.

4. A capacitor bank as claimed in claim 2 wherein the capacitor bank comprises a plurality of double-layer capacitors.

5. A capacitor bank as claimed in claim 3 wherein the positive assembly contacts the negative assembly of another capacitor bank, a negative contact pin couples the negative terminals of the respective capacitor banks, and a positive contact pin couples the positive terminals of the respective capacitor banks, thereby establishing a parallel electrical connection between the respective capacitor banks.

6. A capacitor bank as claimed in claim 5 wherein the contact pins extend substantially perpendicular to the positive assembly.

7. A capacitor bank as claimed in claim 3 wherein the positive assembly contacts the positive assembly of another capacitor bank, a contact pin couples the negative terminal of the capacitor bank with the positive terminal of the other capacitor bank, thereby establishing a series electrical connection between the respective capacitor banks.

8. A capacitor bank as claimed in claim 7 wherein the contact pin extends substantially perpendicular to the positive assembly.

9. A capacitor bank as claimed in claim 3 wherein the positive assembly contacts the negative assembly of another capacitor bank, a contact pin couples the positive terminal of the capacitor bank with the negative terminal of the other capacitor bank, thereby establishing a series electrical connection between the respective capacitor banks.

10. A capacitor bank as claimed in claim 9 wherein the contact pin extends substantially parallel to the positive assembly.

11. A capacitor bank as claimed in claim 4 wherein the capacitors are arranged in multiple series-connected groups, wherein the capacitors within a group of capacitors are connected together in parallel.

12. A capacitor bank as claimed in claim 11 wherein each assembly includes a bus bar assembly having multiple bus bars wherein each bus bar connects the capacitors within a group in parallel.

13. A capacitor bank as claimed in claim 12 wherein each assembly includes a bus bar assembly having multiple bus bars wherein each bus bar connects at least two capacitor groups in series.

14. A capacitor bank as claimed in claim 13 wherein each assembly includes a circuit board having at least one voltage balancing circuit electrically coupled to multiple series-connected capacitors.

15. A capacitor bank as claimed in claim 14 wherein the circuit board includes at least one voltage sensor for measuring the voltage across the capacitor bank.

16. A capacitor bank as claimed in claim 11 wherein the capacitor is welded to at least one associated bus bar.

* * * * *